(12) United States Patent
Kaneko

(10) Patent No.: US 8,287,130 B2
(45) Date of Patent: Oct. 16, 2012

(54) PROJECTOR AND METHOD FOR CONTROLLING PROJECTOR

(75) Inventor: Eiji Kaneko, Yamagata-mura (JP)

(73) Assignee: Seiko Epson Corporation, Toyko (JP)

( * ) Notice: Subject to any disclaimer, the term of this patent is extended or adjusted under 35 U.S.C. 154(b) by 608 days.

(21) Appl. No.: 12/493,269

(22) Filed: Jun. 29, 2009

(65) Prior Publication Data

US 2010/0002197 A1    Jan. 7, 2010

(30) Foreign Application Priority Data

Jul. 4, 2008  (JP) .................................. 2008-175794

(51) Int. Cl.
G03B 21/20      (2006.01)

(52) U.S. Cl. .......................................... 353/31; 250/205

(58) Field of Classification Search .................... 353/31, 353/85–86, 121–122; 250/205, 214 AL, 250/214 B
See application file for complete search history.

(56) References Cited

U.S. PATENT DOCUMENTS

| | | | |
|---|---|---|---|
| 6,634,757 B2 | 10/2003 | Asakawa | |
| 6,894,697 B2 | 5/2005 | Matsuda | |
| 6,962,416 B2 | 11/2005 | Ohara | |
| 7,545,397 B2 * | 6/2009 | O'Dea et al. | 345/694 |
| 7,614,753 B2 * | 11/2009 | Zavarehi et al. | 353/85 |
| 7,719,551 B2 * | 5/2010 | Aoki et al. | 345/690 |
| 7,876,301 B2 * | 1/2011 | Aoki et al. | 345/89 |
| 7,898,557 B2 * | 3/2011 | Aoki et al. | 345/690 |
| 8,042,952 B2 * | 10/2011 | Tanaka et al. | 353/85 |
| 8,120,560 B2 * | 2/2012 | Aoki et al. | 345/89 |

FOREIGN PATENT DOCUMENTS

| | | |
|---|---|---|
| JP | 2000-66166 A | 3/2000 |
| JP | 2002-41016 A | 2/2002 |
| JP | 2002-241437 A | 8/2002 |
| JP | 2002-250906 A | 9/2002 |
| JP | 2004-4284 A | 1/2004 |
| JP | 2006-162995 A | 6/2006 |

* cited by examiner

Primary Examiner — Seung C Sohn
(74) Attorney, Agent, or Firm — AdvantEdge Law Group, LLC

(57) ABSTRACT

A projector, that projects an image on a projection surface in accordance with an image signal, includes: an optical system that includes a light source and projects projection light representing the image; an optical sensor that receives the light from the projection surface; and an adjuster that carries out a first adjustment process of adjusting the brightness of the projection light in accordance with the output from the optical sensor before the light source illuminates.

10 Claims, 13 Drawing Sheets

PROJECTOR AND METHOD FOR CONTROLLING PROJECTOR

The entire disclosure of Japanese Patent Application No. 2008-175794 filed Jul. 4, 2008 is expressly incorporated by reference herein.

BACKGROUND

1. Technical Field

The present invention relates to a projector and a method for controlling the projector.

2. Related Art

Projectors have been used to project images. A known type of projector, for example, projects video images toward a screen, detects the brightness on the screen with a brightness sensor, compares the measured brightness data with reference data, and adjusts the video output from the projector in such a way that the difference between the measured brightness data and the reference data approaches a predetermined standard value.

JP-A-2000-66166, JP-A-2002-41016, JP-A-2002-250906, JP-A-2002-241437, JP-A-2004-4284, and JP-A-2006-162995 are exemplified as other related art documents.

However, a variety of problems occur due to the adjustment of the projection light. For example, when a projected image is used to adjust the projection light, a user may need to wait for a long period from when the projector is turned on until when the projection light is adjusted. Further, adjusting the projection light may inhibit the user from projecting a desired image.

SUMMARY

An advantage of some aspects of the invention is to provide a technology capable of eliminating the problems resulting from the projection light adjustment.

The invention has been made to solve at least part of the problems described above and can be embodied in the following forms or applications.

First Application

A projector that projects an image on a projection surface in accordance with an image signal, the projector including an optical system that includes a light source and projects projection light representing the image, an optical sensor that receives the light from the projection surface, and an adjuster that carries out a first adjustment process of adjusting the brightness of the projection light in accordance with the output from the optical sensor before the light source illuminates.

According to the above configuration, since the brightness of the projection light is adjusted in accordance with the output from the optical sensor that receives the light from the projection surface, adjusting the projection light will not cause any problem.

Second Application

The projector according to the first application, further including a frame selector that selects an adjustment image, during image projection according to the image signal, as part of a plurality of time-series frame images to be sequentially projected, wherein the adjuster carries out a second adjustment process of adjusting the color tone of the projection light in accordance with the output produced by the optical sensor when the adjustment image is projected.

According to the above configuration, since the color tone of the projection light is adjusted in accordance with the projected adjustment image during the image projection according to the image signal, it is possible to prevent a disadvantageous situation in which adjusting the projection light inhibits the user from projecting a desired image.

Third Application

The projector according to the second application, wherein the frame selector selects the adjustment image to allow the adjuster to carry out the second adjustment process in response to at least one of the following: (A) a scheduled timing, (B) change in illuminance in the environment in which the projector is placed, and (C) displacement of the projector.

According to the above configuration, the adjustment of the projection light according to an environmental change can be made without any problem.

Fourth Application

The projector according to the first application, wherein the optical sensor is an imaging unit that images the projection surface to acquire image data, and the adjuster adjusts the brightness as a function of the position in a projected image in the first adjustment process in accordance with first image data acquired by the imaging unit before the light source illuminates.

According to the above configuration, the adjustment of the brightness as a function of the position in an image can be made without any problem.

Fifth Application

The projector according to the fourth application, wherein in the first adjustment process, the adjuster divides a projected image into a plurality of blocks and adjusts the brightness of each of the blocks in accordance with part of the area in the first image data on which the block is projected.

According to the above configuration, the brightness of each of the blocks can be appropriately adjusted in agreement with the portion of the projection surface on which the block is actually projected.

Sixth Application

The projector according to the first application, wherein in the first adjustment process, the adjuster adjusts the brightness of the projection light in such a way that the brightness of the projection light produced when the brightness of the projection surface expressed in the form of the output from the optical sensor is higher than a predetermined threshold is higher than the brightness of the projection light produced when the brightness of the projection surface is lower than the predetermined threshold.

According to the above configuration, since the brightness of the projection light is high when the projection surface is bright, whereas the brightness of the projection light is low when the projection surface is dim, it is possible to prevent a projected image from being excessively dim or excessively glaring. As a result, the projection light can be appropriately adjusted without any problem.

Seventh Application

The projector according to the second application, wherein the optical sensor is an imaging unit that images the projection surface to acquire image data, and the adjuster adjusts the color tone as a function of the position in a projected image in the second adjustment process in accordance with second image data acquired by the imaging unit when the adjustment image is projected.

According to the above configuration, the adjustment of the color tone as a function of the position in an image can be made without any problem.

Eighth Application

The projector according to the seventh application, wherein in the second adjustment process, the adjuster divides a projected image into a plurality of blocks and adjusts the color tone of each of the blocks in accordance with part of the area in the second image data on which the block is projected.

According to the above configuration, the color tone of each of the blocks can be appropriately adjusted in agreement with the portion of the projection surface on which the block is actually projected.

Ninth Application

A method for controlling a projector that projects an image on a projection surface in accordance with an image signal, the method including carrying out a first adjustment process of adjusting the brightness of projection light representing the image in accordance with the output from an optical sensor that receives the light from the projection surface before a light source illuminates, the light source contained in an optical system that projects the projection light.

The invention can be embodied in a variety of forms. Examples of the forms may include a projector and a method for controlling the projector, a computer program for achieving the function of the apparatus and method, and a recording medium on which the computer program is recorded.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Figure 1:
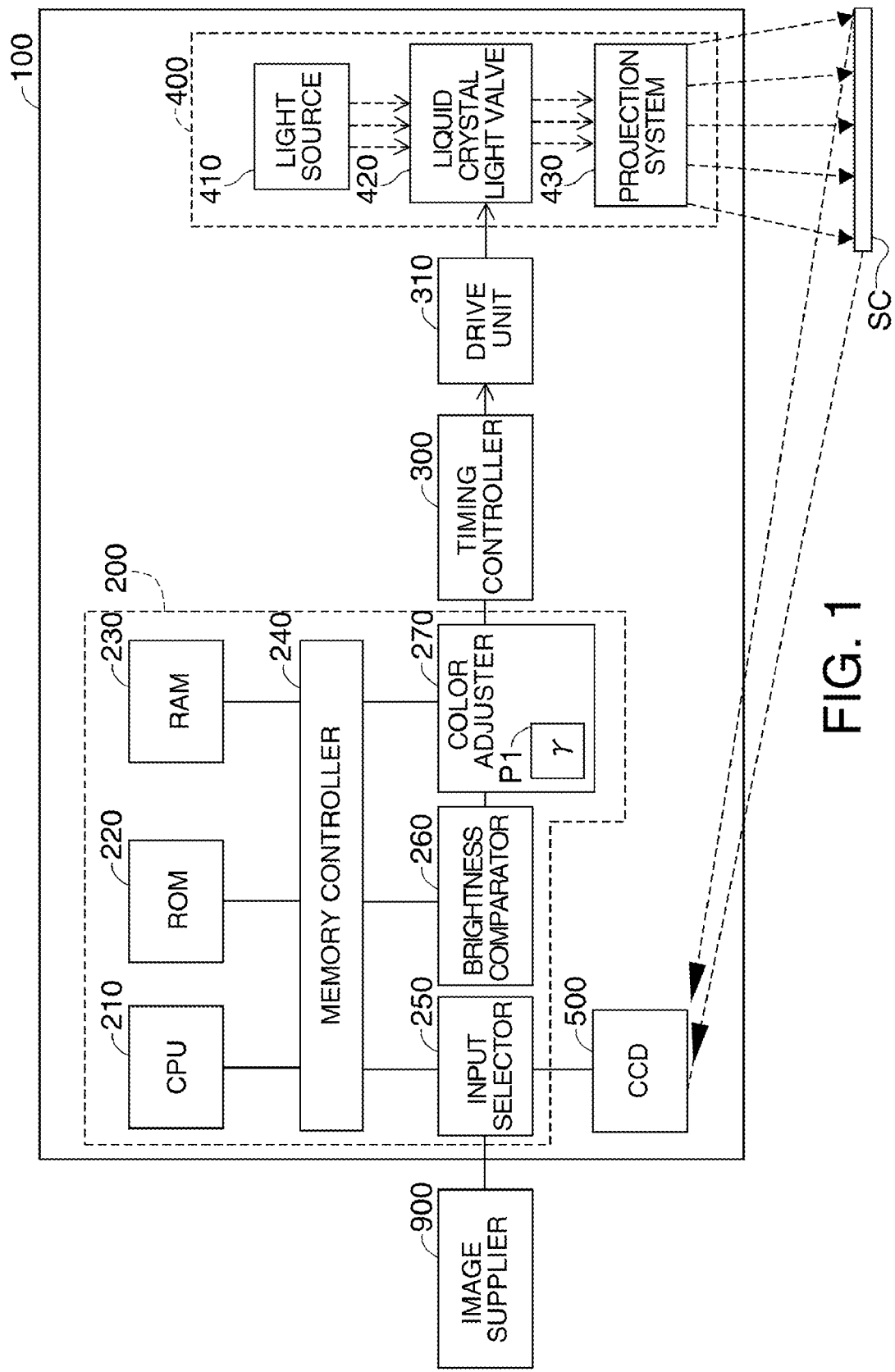
FIG. 1 explains a projector as an embodiment of the invention.

The invention will be described below with reference to embodiments in the following order.
  A. First Embodiment
  B. Second Embodiment
  C. Third Embodiment
  D. Fourth Embodiment
  E. Variations
A. First Embodiment FIG. 1 explains a projector as an embodiment of the invention. The projector 100 is an image display apparatus that projects projection light representing an image in accordance with an image signal to display the image on a screen SC or any other projection surface. The projector 100 includes a display control unit 200, a timing controller 300, a drive unit 310, an optical system 400, and a CCD camera (Charge Coupled Device Camera) 500 (the CCD camera 500 is hereinafter sometimes simply referred to as the "CCD 500"). In the present embodiment, the components in the projector 100 are formed of hardware, such as dedicated devices and circuits.

The optical system 400 includes a light source 410, a liquid crystal light valve 420, and a projection system 430.

The light source 410 can be a high-pressure mercury lamp, a halogen lamp, a metal-halide lamp, or a variety of other light source lamps. The light source 410 is not limited to the above light source lamps but can be a light emitting diode, a laser diode, or a variety of other light sources.

The liquid crystal light valve 420 has a plurality of pixels and drives the pixels based on drive voltages supplied from the drive unit 310. The liquid crystal light valve 420 activates the liquid crystal molecules in accordance with the drive voltages to modulate illumination light emitted from the light source 410 into projection light representing an image. In the present embodiment, the liquid crystal light valve 420 includes three light valves (not shown) for three color components, red (R), green (G), and blue (B). The drive unit 310 controls the RGB light valves.

The projection system 430 projects the projection light toward a projection surface (the screen SC, for example).

The display control unit 200 controls the components in the projector 100. The display control unit 200 includes a CPU 210, a ROM 220, a RAM 230, a memory controller 240, an input selector 250, a brightness comparator 260, and a color adjuster 270. The memory controller 240 is connected to the CPU 210, the ROM 220, the RAM 230, the input selector 250, the brightness comparator 260, and the color adjuster 270. The memory controller 240 transfers data between the above elements. The CPU 210 is connected to the components in the display control unit 200 via a bus (not shown). The CPU 210 controls the components in the display control unit 200.

The input selector 250 selects one image signal (video signal) from those inputted to the display control unit 200. In the embodiment shown in FIG. 1, the input selector 250 chooses either a signal from an image supplier 900 connected to the projector 100 or a signal from the CCD 500. As will be described later, the signal from the CCD 500 is used to adjust color adjustment setting. The signal from the image supplier 900 is usually chosen to project an image.

The image supplier 900 is an apparatus that supplies an image signal (video signal), such as a personal computer and a DVD player. Examples of the signal from the image supplier 900 may include a composite signal, a component signal, a digital signal, and other image signals (video signals).

The CCD 500 is an imaging device that images the projection surface (screen SC, for example). In the present embodiment, the CCD 500 performs imaging to produce an image signal (image data) representing a color still image. In FIG. 1, the direction in which the CCD 500 performs imaging only apparently differs greatly from the direction in which the projection system 430 performs projection. In practice, however, the CCD 500 is oriented in a direction that is substantially the same as the projection direction. The CCD 500 is disposed to image the projection surface (take an image of the projection screen) roughly from the front. Therefore, when the projection system 430 projects an image from a position in front of the screen SC, the CCD 500 also images the screen SC from a position roughly in front of the screen SC.

The input selector 250 includes a signal converter (not shown). The signal converter converts the received signal into digital image data (A/D conversion and I/P conversion, for example) processable by the display control unit 200.

The input selector 250 stores image data representing an image to be projected in the RAM 230 in accordance with the image signal from the image supplier 900. An image to be projected is sometimes called a "frame image." Data representing a frame image is sometimes hereinafter referred to as "frame data." The color adjuster 270 reads the frame data stored in the RAM 230 and adjusts the color thereof. In the present embodiment, the color adjuster 270 performs gamma correction using a gamma correction value P1 (the gamma correction value P1 is stored in a memory (not shown) in the color adjuster 270). Gamma correction is a process of adjusting the gamma characteristic of the brightness of the projection light. The color adjuster 270 may make other color adjustment as well as the gamma correction. For example, the color adjuster 270 may make what is called VT correction. VT correction is a process of correcting image data (gray scales of RGB color components, for example) in accordance with nonlinear input/output characteristics specific to the liquid crystal light valve 420.

The color adjuster 270 supplies the corrected image data to the timing controller 300. The timing controller 300 converts the received image data into formatted data suitable for the control performed in the liquid crystal light valve 420. The timing controller 300 then supplies the converted data to the drive unit 310 in accordance with a predetermined timing. The drive unit 310 drives the liquid crystal light valve 420 in accordance with the data received from the timing controller 300. As the result of these operations, the frame image is projected on the screen SC. It is noted that the image signal from the image supplier 900 represents a plurality of time-series frame images. The frame image projected on the screen SC is updated in accordance with the image signal. As a result, the time-series frame images are sequentially projected.

Figure 2:
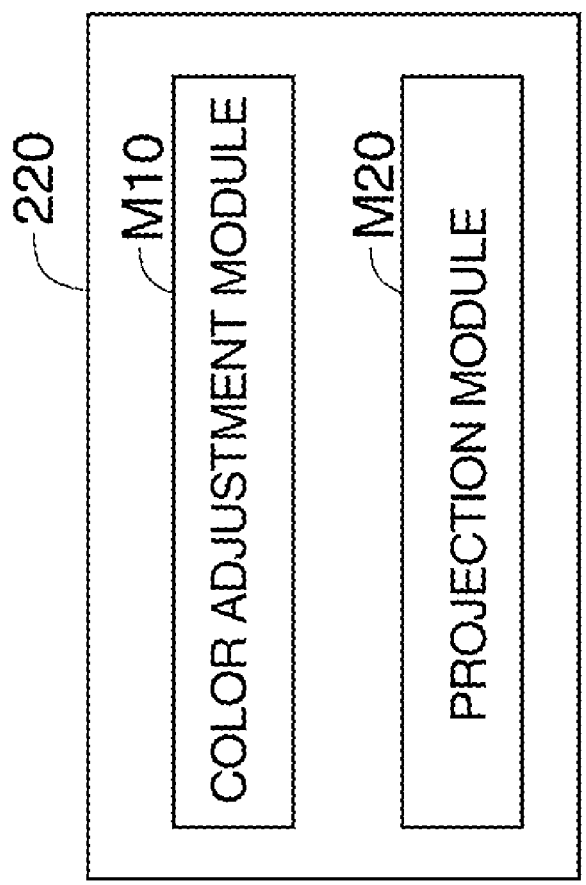
FIG. 2 is a schematic view showing data and modules stored in a ROM 220 (FIG. 1).

FIG. 2 is a schematic view showing data and modules stored in the ROM 220 (FIG. 1). In the present embodiment, the ROM 220 stores a color adjustment module M10 and a projection module M20. The modules M10 and M20 are programs executed by the CPU 210. That the CPU executes a process in accordance with a module is hereinafter sometimes simply referred to as that "a module executes a process." The modules M10 and M20 can send and receive data to and from each other via the RAM 230 (FIG. 1). The modules M10 and M20 will be described later in detail.

Figure 3:
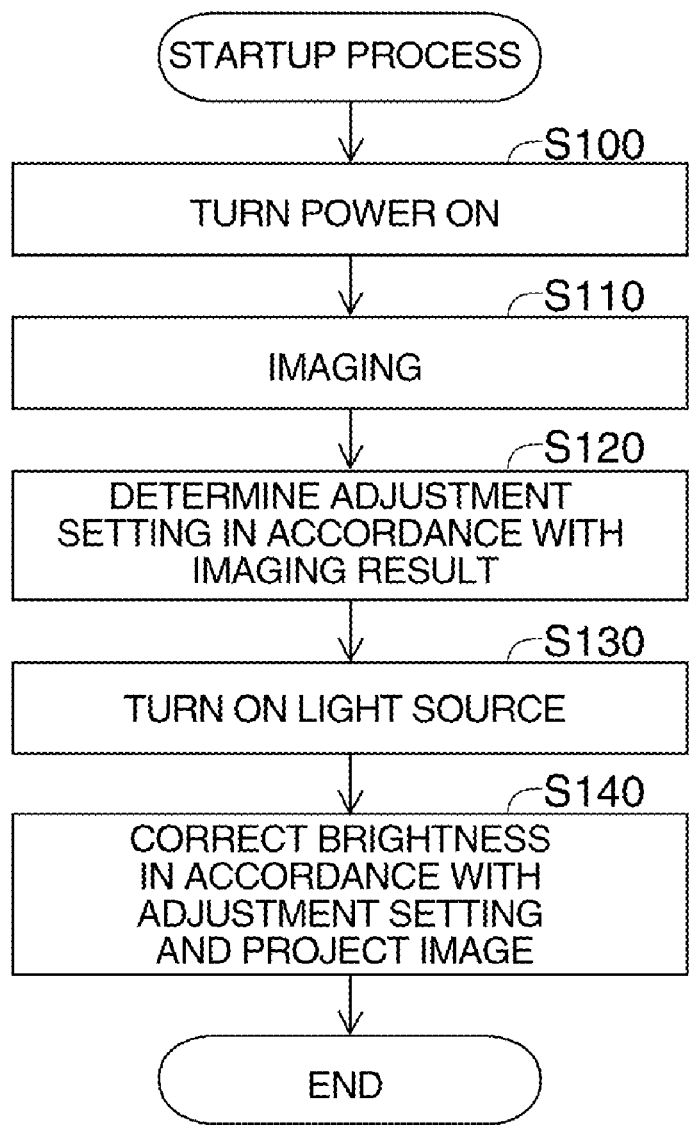
FIG. 3 is a flowchart showing the procedure of a startup process of a projector 100.

FIG. 3 is a flowchart showing the procedure of a startup process of the projector 100. The startup process is initiated in response to the action of turning on the projector 100 (step S100). In the present embodiment, the steps S110 and S120 in the startup process determine the gamma correction value P1 for the gamma correction (FIG. 1).

Figure 4:
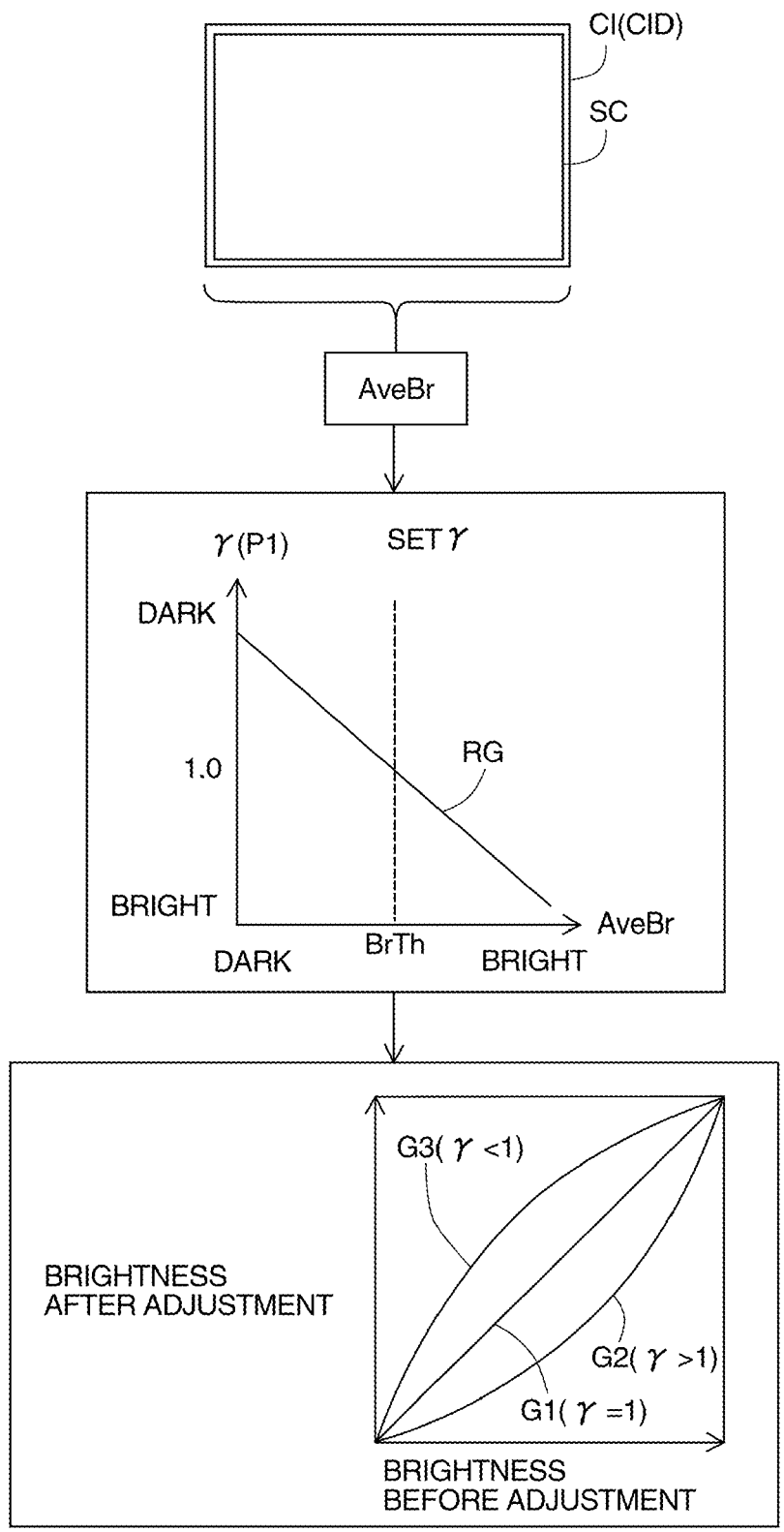
FIG. 4 is a schematic view showing how a gamma correction value P1 is determined in accordance with an imaging result.

After the power is turned on, in the following step S110, the color adjustment module M10 (FIG. 2) instructs the CCD 500 (FIG. 1) to image the projection surface. FIG. 4 is a schematic view showing how the gamma correction value P1 is determined in accordance with the imaging result. The CCD 500 performs imaging in accordance with the instruction from the color adjustment module M10. As a result, the CCD 500 produces image data CID representing the projection surface. In the embodiment shown in FIG. 4, an image CI described by the image data CID shows the imaged screen SC. At this point, the light source 410 has not illuminated. That is, the CCD 500 performs imaging with the light source 410 turned off. As a result, the image data CID produced by the CCD 500 can reflect the luminosity of the environment in which the projector 100 is placed and the color of the screen SC without being affected by the projection light.

Figure 5:
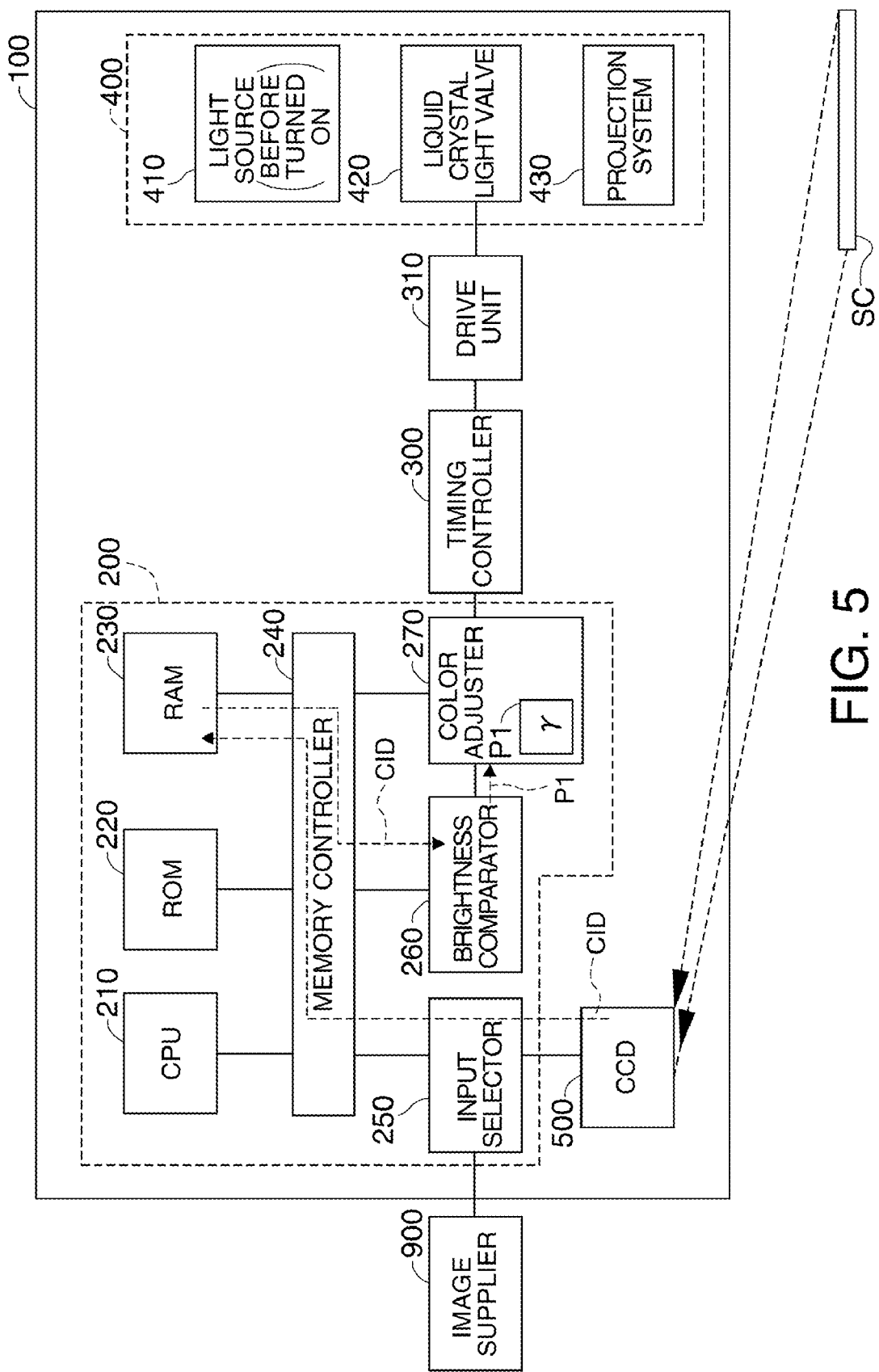
FIG. 5 is a schematic view showing the actions of the projector 100 in a startup process.

FIG. 5 is a schematic view showing the actions of the projector 100 in the startup process. In the following step S120 in FIG. 3, the color adjustment module M10 (FIG. 2) instructs the input selector 250 to select a signal (image data) from the CCD 500 from among other signals. In accordance with the instruction, the input selector 250 receives the image data CID from the CCD 500 and stores the image data CID in the RAM 230.

The color adjustment module M10 (FIG. 2) then instructs the brightness comparator 260 (FIG. 5) to determine the gamma correction value P1 (in the present embodiment, the gamma correction value P1 corresponds to a setting for adjusting the brightness of the projection light). In accordance with the instruction, the brightness comparator 260 reads the image data CID from the RAM 230 and calculates the average AveBr of the brightness values of the pixels (FIG. 4). The image data CID may be expressed in a color space that contains no brightness (RGB color space, for example) in some cases. In this case, the brightness comparator 260 can obtain the brightness value of each of the pixels by converting the data into those expressed in a color space that contains brightness (YUV color space, for example).

The brightness comparator 260 (FIG. 5) then determines the gamma correction value P1 in accordance with the average brightness value AveBr. In the present embodiment, the brightness comparator 260 determines the gamma correction value P1 in accordance with a predetermined relationship between the average brightness value AveBr and the gamma correction value P1. The graph RG in the middle portion of FIG. 4 shows the relationship between the average brightness value AveBr and the gamma correction value P1 (In the FIG. 4, the gamma correction value P1 is indicated by the Greek character γ). The horizontal axis represents the average brightness value AveBr, and the vertical axis represents the gamma correction value P1. In the present embodiment, the relationship is stored in the form of a lookup table in a memory (not shown) provided in the brightness comparator 260. The relationship does not necessarily take the form of a lookup table, but may be set in an arbitrary form (a function may be employed, for example).

The graphs G1 to G3 shown in the lower portion of FIG. 4 show brightness correction according to the gamma correction value P1. The horizontal axis represents the brightness before correction, and the vertical axis represents the brightness after correction. The brightness expressed by those graphs is normalized and ranges from 0 to 1. In the present embodiment, the brightness after correction is expressed in the form of the brightness before correction raised to some power. The gamma correction value P1 represents the exponent of the power. When the gamma correction value P1 is 1, the brightness after correction is the same as the brightness before correction, as indicated by the first graph G1. When the gamma correction value P1 is greater than 1, the brightness after correction is lower than the brightness before correction, as indicated by the second graph G2. When the gamma correction value P1 is smaller than 1, the brightness after correction is higher than the brightness before correction, as indicated by the third graph G3.

In the present embodiment, the greater the average brightness value AveBr, the smaller the gamma correction value P1, as indicated by the graph RG shown in the middle portion of FIG. 4. That is, the greater the average brightness value AveBr, the higher the brightness after correction.

A high average brightness value AveBr means that the projection surface (screen SC, for example) is bright. For example, when external light or interior illumination light incident on the projection surface is bright, or when the color of the screen SC is bright, the average brightness value AveBr is large. It is difficult to view an image projected by using dim projection light on a bright projection surface. To address the problem, the visibility of the image is improved by increasing the brightness of the projection light. In the embodiment shown in FIG. 4, when the average brightness value AveBr is greater than a predetermined threshold BrTh, the gamma correction value P1 is set to a value smaller than 1.

Conversely, a low average brightness value AveBr means that the projection surface is dim. In this case, bright projection makes the resultant projected image glaring. To address the problem, the brightness of the projection light is reduced to make the image less glaring. In the embodiment shown in FIG. 4, when the average brightness value AveBr is lower than the threshold BrTh, the gamma correction value P1 is set to a value greater than 1.

As described above, the brightness comparator 260 (FIG. 5) determines the gamma correction value P1 in accordance with the average brightness value AveBr. The brightness comparator 260 then notifies the color adjuster 270 of the determined gamma correction value P1. The color adjuster 270 stores the received gamma correction value P1 in a memory (not shown).

In the following step S130 in FIG. 3, the projection module M20 (FIG. 2) instructs the light source 410 (FIG. 1) to illuminate. The light source 410 illuminates in response to the instruction.

In the following step S140, the projection module M20 (FIG. 2) initiates image projection according to the image signal from the image supplier 900. The projection module M20 instructs the input selector 250 to select the image signal from the image supplier 900 from among other signals. In accordance with the instruction, the input selector 250 receives the image signal from the image supplier 900 and stores frame data in the RAM 230.

Figure 6:
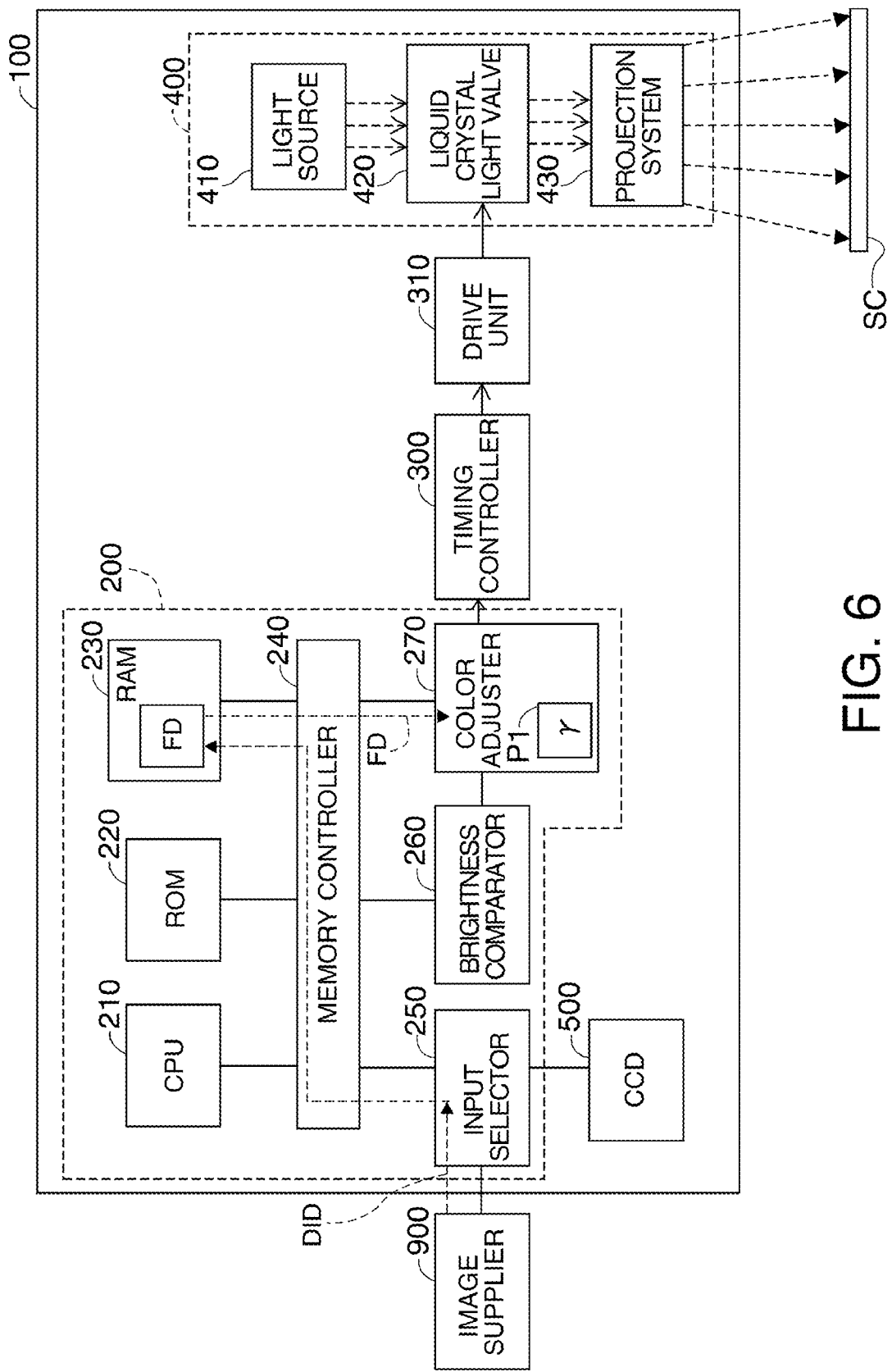
FIG. 6 is a schematic view showing image projection actions of the projector 100.

FIG. 6 is a schematic view showing the image projection actions of the projector 100. The input selector 250 receives an image signal DID from the image supplier 900 and stores frame data FD in the RAM 230. The color adjuster 270 makes gamma correction using the gamma correction value P1 on the frame data FD read from the RAM 230 (see the graphs shown in the lower portion of FIG. 4). In the present embodiment, the gamma correction is made uniformly across any of the frame images. That is, the brightness values of all the pixels are adjusted in accordance with a common gamma correction value P1.

The color adjuster 270 supplies the corrected image data to the timing controller 300. As described above, the projector 100 projects the corrected image on the screen SC. The projection module M20 (FIG. 2) controls the input selector 250 and the color adjuster 270 in accordance with the image signal DID to sequentially project time-series frame images.

As described above, in the present embodiment, since the brightness of the projection light is adjusted in accordance with the imaged projection surface before the light source illuminates, the period from the time when the power is turned on to the time when the light source 410 illuminates can be effectively used. As a result, unlike a case using the imaged projection surface after the light source 410 illuminates, the user does not have to wait for a very long period from when the projector 100 is turned on until when the gamma correction value P1 is determined. Further, no image is projected before the projection light is adjusted.

Moreover, in the present embodiment, the imaging result (image CI) obtained before the light source 410 illuminates is used to determine the gamma correction value P1. It is therefore possible to determine the gamma correction value P1 that reflects the color of the projection surface (the screen SC or a wall, for example) and the luminosity of the light incident on the projection surface without being affected by the projection light. In the present embodiment, in particular, the gamma correction value P1 is determined in accordance with the luminosity of the projection surface. As a result, unlike a case where the gamma correction value P1 is simply determined in accordance with the luminosity in the environment in which the projector 100 is placed, it is possible to make brightness adjustment suitable for the luminosity of the projection surface on which an image is actually projected.

Further, in the present embodiment, the gamma correction value P1 is determined in such a way that the brightness of the projection light produced when the average brightness value AveBr is greater than the threshold BrTh is higher than the brightness of the projection light produced when the average brightness value AveBr is smaller than the threshold BrTh (FIG. 4). It is therefore possible to prevent the projected image from being excessively dim or excessively glaring. It is noted that the threshold BrTh may be experimentally determined.

The average brightness value AveBr is not necessarily used to determine the gamma correction value P1, but a variety of values representing the luminosity of the image CI captured before the light source 410 illuminates can be used. For example, the brightness value at a predetermined representative position in the image CI may be used. The average of the brightness values at a plurality of predetermined representative positions may alternatively be used.

In the present embodiment, the CPU 210 (color adjustment module M10), the brightness comparator 260, and the color adjuster 270 as a whole correspond to the "adjuster" in the claims.

B. Second Embodiment

Figure 7:
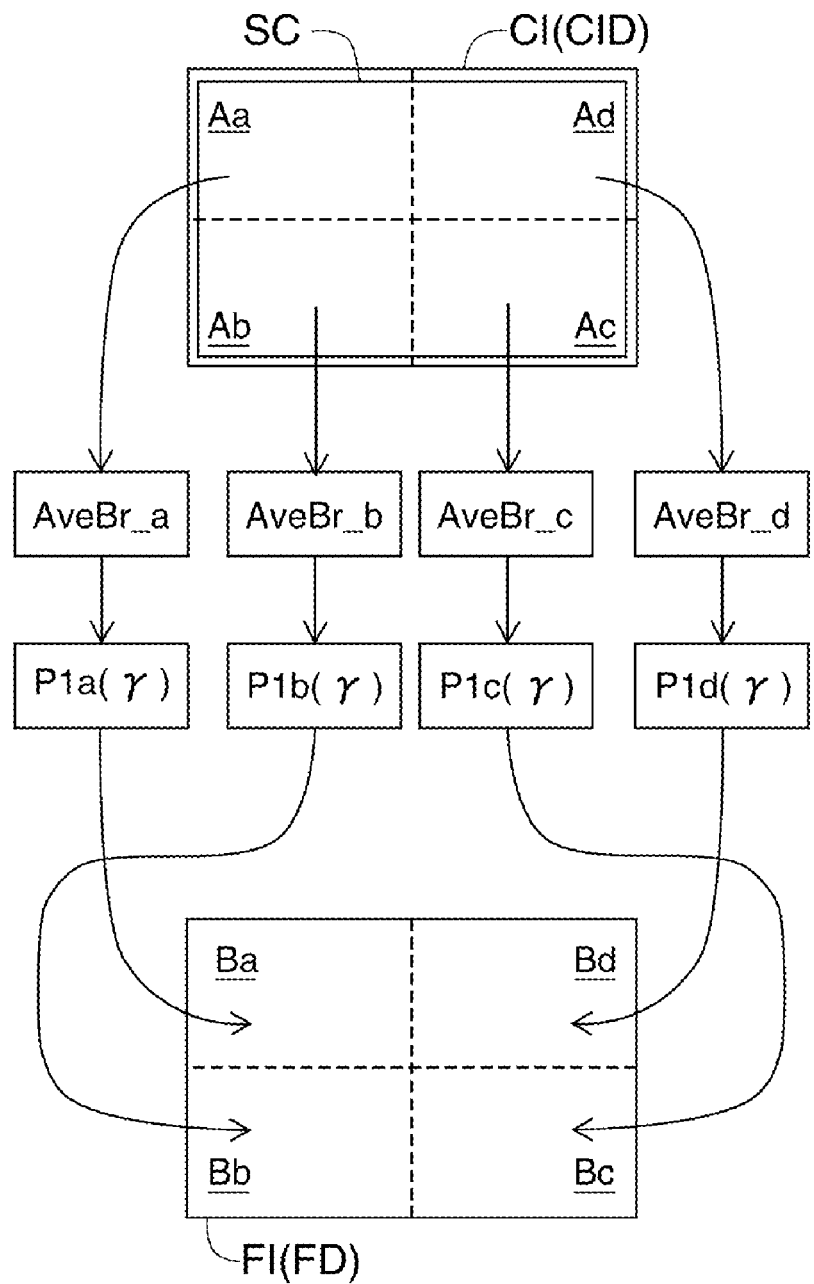
FIG. 7 is a schematic view of another embodiment of gamma correction.

FIG. 7 is a schematic view of another embodiment of the gamma correction. This embodiment differs from the embodiment shown in FIG. 4 in two ways. A first difference is that the brightness comparator 260 (FIG. 1) divides the image CI captured by the CCD 500 into a plurality of blocks and the average brightness value and the gamma correction value are determined for each of the blocks. A second difference is that the color adjuster 270 divides the frame data FD into a plurality of blocks, as in the case of the image CI, and the gamma correction is made for each of the blocks. The procedure of the processes is the same as that in the first embodiment shown in FIG. 3. The configuration of the projector is also the same as that of the projector 100 shown in FIGS. 1 and 2.

In the embodiment shown in FIG. 7, the image CI is divided into four predetermined rectangular blocks (an upper left block Aa, a lower left block Ab, a lower right block Ac, and an upper right block Ad). In the step S120 in FIG. 3, the brightness comparator 260 (FIG. 1) calculates the average brightness value for each of the four blocks Aa to Ad (four average brightness values AveBr_a to AveBr_d). The brightness comparator 260 then determines the gamma correction values for the blocks Aa to Ad (four gamma correction values P1a to P1d). The four gamma correction values P1a to P1d are determined by using the four average brightness values AveBr_a to AveBr_d, respectively, in accordance with the graph RG shown in FIG. 4.

The color adjuster 270 (FIG. 1) divides each frame image FI described by the frame data FD into a plurality of blocks, as in the case of the captured image CI, and makes gamma correction on each of the blocks. In the embodiment shown in FIG. 7, each frame image FI is divided into four predetermined rectangular blocks (an upper left block Ba, a lower left block Bb, a lower right block Bc, and an upper right block Bd). The color adjuster 270 uses the four gamma correction values P1a to P1d to correct the brightness of the four blocks Ba to Bd, respectively. The blocks Aa to Ad of the captured image CI indicate the areas in which the blocks Ba to Bd of the frame image FI are projected, respectively. The brightness adjustment for each of the blocks is thus made on the area on which the block is projected in the captured image CI. As a result, the brightness adjustment for each of the blocks can be appropriately made in agreement with the portion of the projection surface on which the block is actually projected.

External light may be incident, for example, on an upper left portion of the screen SC in some cases. In this case, the first block Aa is brighter than the other blocks Ab to Ad in the capture image CI (AveBr_a>AveBr_b, AveBr_c, AveBr_d). The gamma correction value P1a for the first block Ba is smaller than the gamma correction values P1b to P1d for the other blocks Bb to Bd. That is, the color adjuster 270 (FIG. 1) makes the brightness of the first block Ba higher than that of the other blocks Bb to Bd in the frame image FI, otherwise the upper left portion of the projected frame image FI, which is illuminated with external light, is hardly visible, or bright projection light makes the other portions of the frame image FI glaring. In the present embodiment, adjusting the brightness for each of the blocks this way allows the brightness to be appropriately adjusted as a function of the position in the image.

The pattern used to divide a frame image FI is not necessarily the pattern shown in FIG. 7, but can be an arbitrary pattern. For example, a frame image FI may be divided into 3×3=9 rectangular blocks.

To determine the gamma correction value for each block in a frame image FI, the average brightness value of the corresponding area in a captured image CI is not necessarily used, but a variety of other values obtained from part of the corresponding area in the captured image CI can be used (the "corresponding area" corresponding to a block in a frame image FI means the area of the projection surface on which the block is projected). For example, the brightness value at a predetermined representative position in the corresponding area may be used. The average of the brightness values at a plurality of predetermined representative positions in the corresponding area may alternatively be used.

C. Third Embodiment

Figure 8:
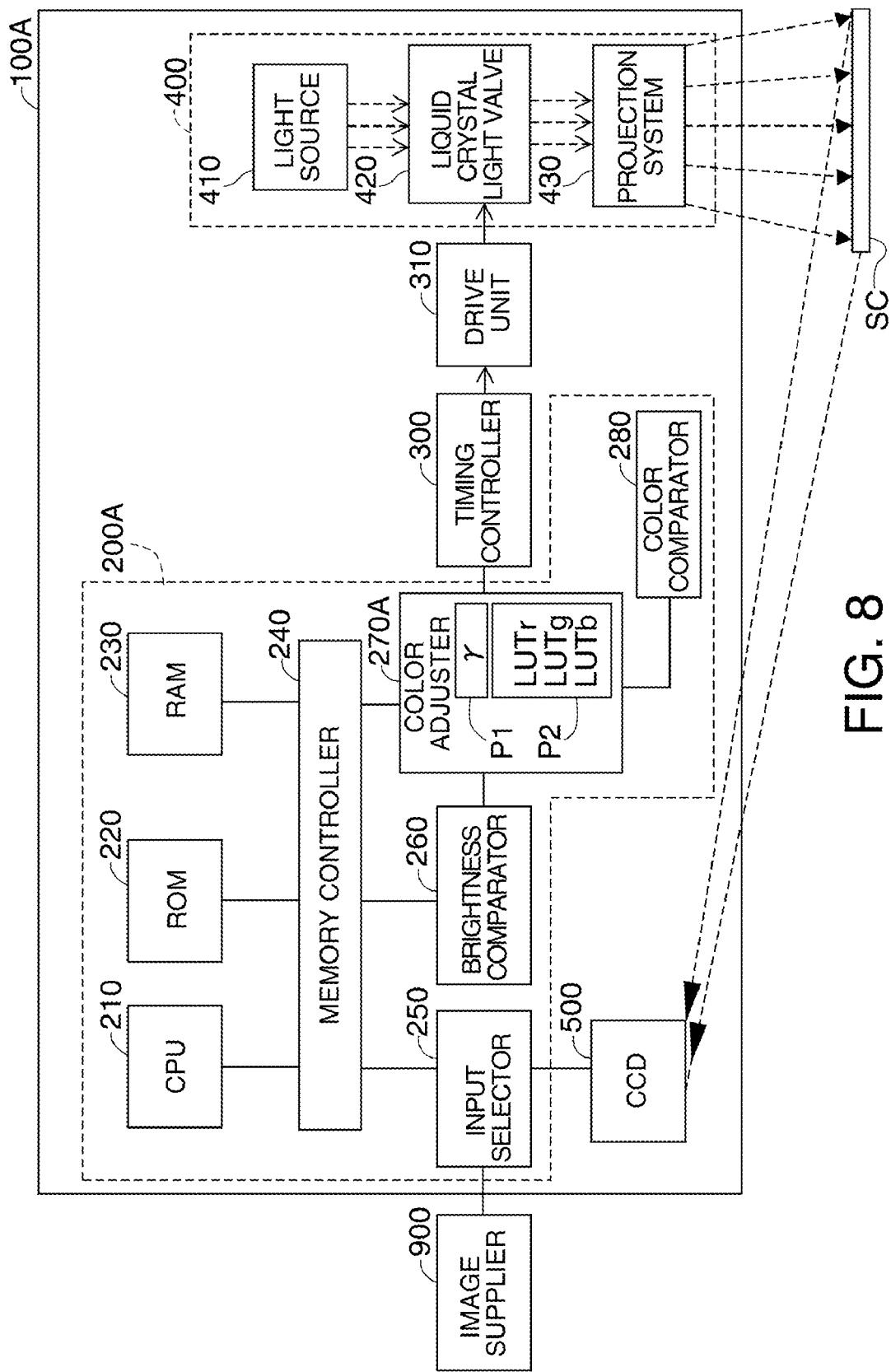
FIG. 8 explains another embodiment of the projector.

FIG. 8 explains another embodiment of the projector. The projector of this embodiment differs from the projector 100 shown in FIG. 1 in two ways. A first difference is that a color comparator 280 is added to the display control unit 200A. A second difference is that a lookup table P2 for VT correction is stored in a memory in the color adjuster 270A. The lookup table P2 includes a lookup table for red (R) LUTr, a lookup table for green (G) LUTg, and a lookup table for blue (B) LUTb. The other configurations of the projector 100A are the same as those of the projector 100 shown in FIG. 1.

Figure 9:
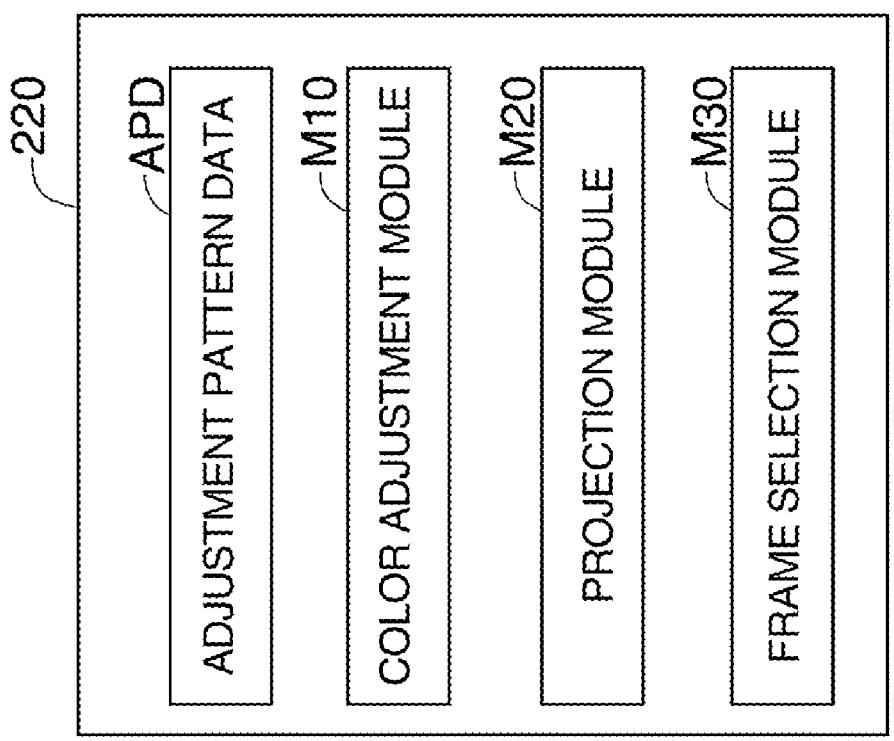
FIG. 9 is a schematic view showing data and modules stored in the ROM 220 in a projector 100A (FIG. 8).

FIG. 9 is a schematic view showing data and modules stored in the ROM 220 in the projector 100A (FIG. 8). Only difference from the embodiment shown in FIG. 2 is that an adjustment pattern data APD and a frame selection module M30 are added.

The projector 100A of the present embodiment executes the startup process, as in the case of the embodiment shown in FIG. 3. The adjustment of the brightness of the projection light in the present embodiment can be the brightness adjustment shown in FIG. 4 or FIG. 7. The projector 100A of the present embodiment further adjusts the color of the projection light during image projection according to an image signal from the image supplier 900. The "color adjustment" used herein means that at least one of the hue, chroma, and brightness is adjusted. As will be described later, the color adjustment is made by adjusting the lookup table P2.

Figure 10:
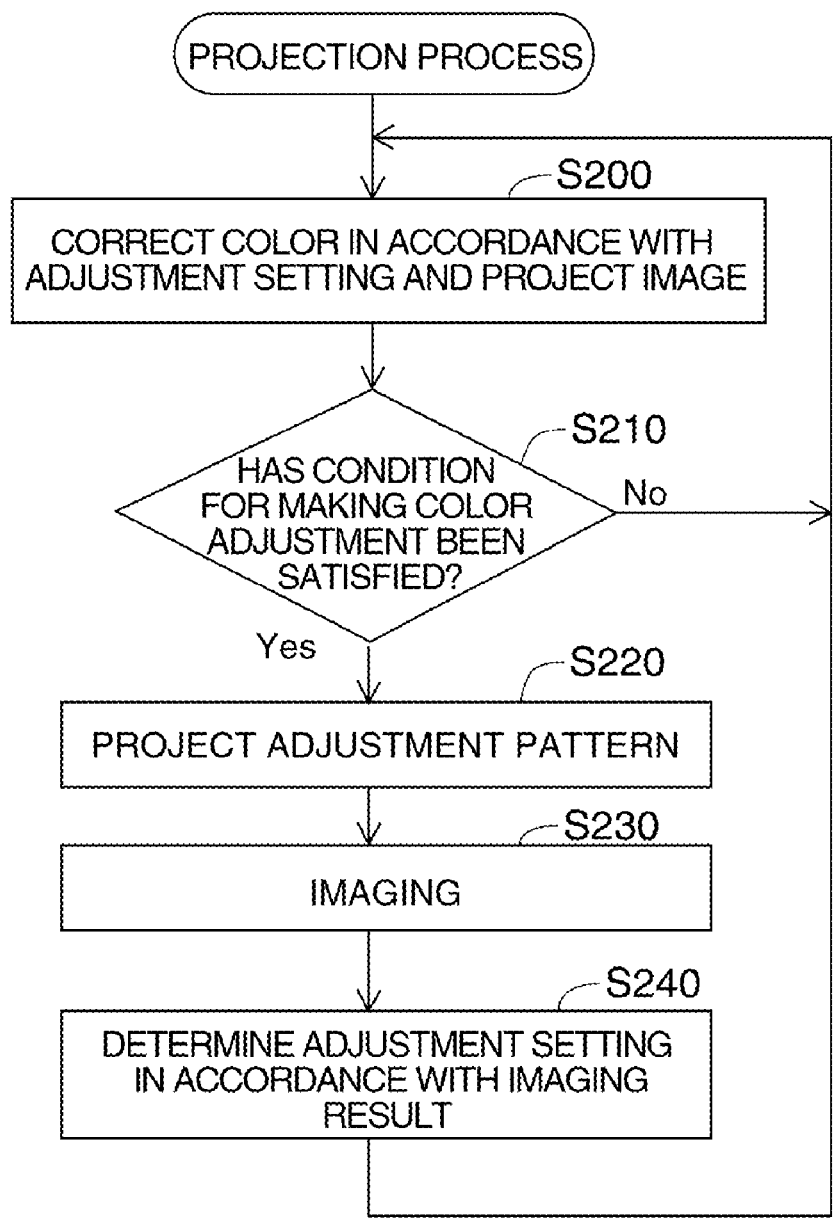
FIG. 10 is a flowchart showing the procedure of s projection process.

FIG. 10 is a flowchart showing the procedure of a projection process. The projection process is carried out subsequent to the step S140 in FIG. 3. In the first step S200, the projection module M20 (FIG. 9) performs image projection according to the image signal from the image supplier 900 (FIG. 8). The image projection is performed in the same manner as in the step S140 in FIG. 3. In the present embodiment, however, the color adjuster 270A makes VT correction as well as the gamma correction. Specifically, the color adjuster 270A converts the image data having undergone the gamma correction into gray scales of the RGB color components and adjusts the RGB gray scales in accordance with the lookup table P2. After the projector 100A is started but before the first adjustment P2 is made on the lookup table, the color adjuster 270A makes VT correction in accordance with a predetermined lookup table P2.

In the following step S210 in FIG. 10, the frame selection module M30 (FIG. 9) judges whether or not the condition for making the color adjustment has been satisfied. In the present embodiment, the color adjustment is made at scheduled timings (every 5 minutes, for example). The frame selection module M30 judges whether or not the present time corresponds to any one of the scheduled timings. When the present time is not the timing when the color adjustment should be made, the step S200 is repeated. As a result, the projector 100A projects images in accordance with the image signal from the image supplier 900 (FIG. 8).

When the condition for making the color adjustment has been satisfied, in the following step S220, the frame selection module M30 (FIG. 9) selects an adjustment pattern described by the adjustment pattern data APD as the frame image to be projected. Specifically, the frame selection module M30 instructs the projection module M20 to process the adjustment pattern data APD instead of the frame data supplied from the image supplier 900 (FIG. 8).

Figure 11:
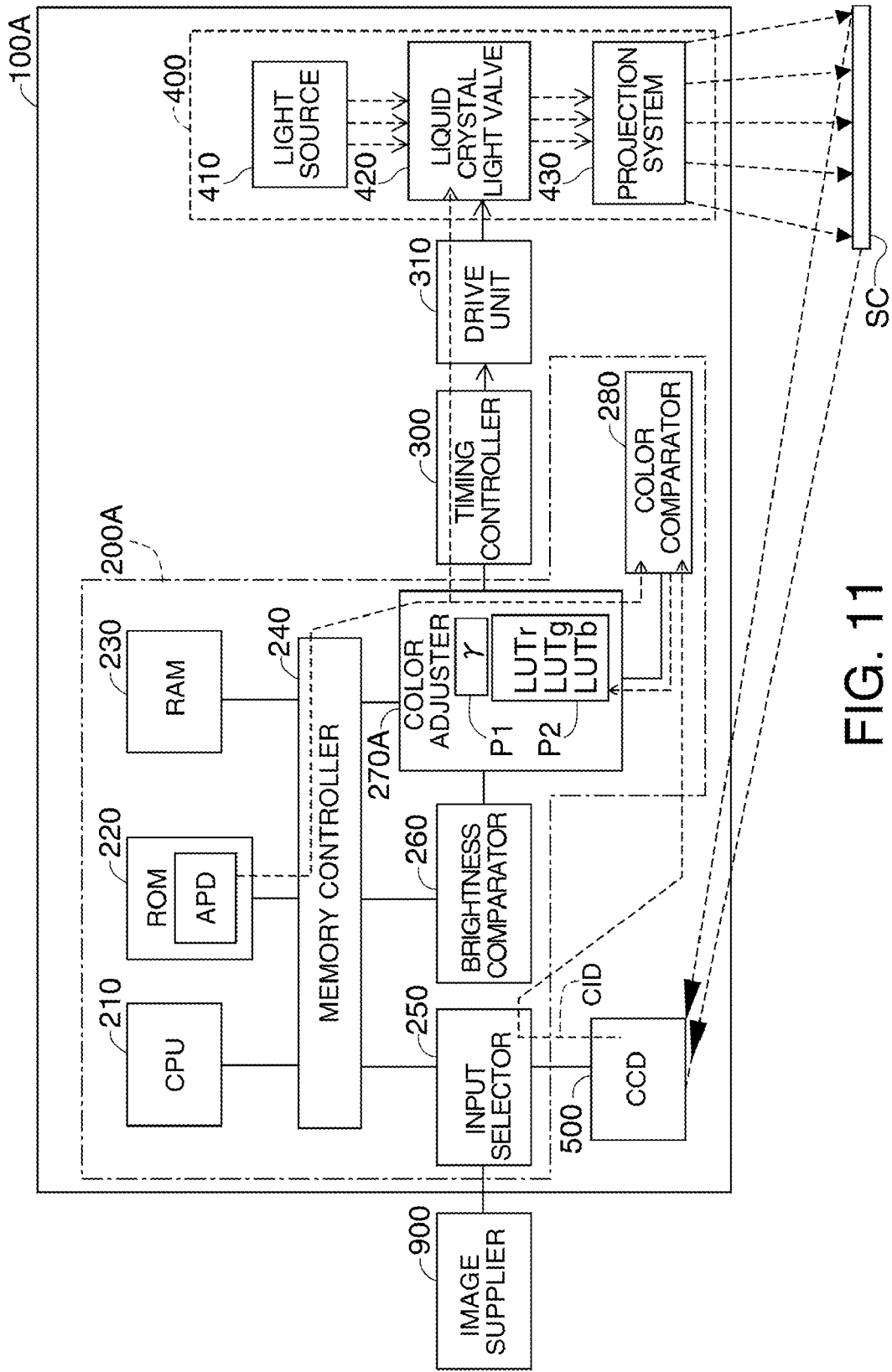
FIG. 11 is a schematic view showing the actions of the projector 100A in color adjustment.

FIG. 11 is a schematic view showing the actions of the projector 100A in the color adjustment. In accordance with the instruction from the frame selection module M30 (FIG. 9), the projection module M20 performs image projection control using the adjustment pattern data APD. As a result, the color adjuster 270A acquires the adjustment pattern data APD and supplies the acquired adjustment pattern data APD to the timing controller 300. In the present embodiment, the color adjustment on the adjustment pattern data APD is omitted.

The timing controller 300, the drive unit 310, and the optical system 400 project the adjustment pattern described by the adjustment pattern data APD, as in the case of frame images.

Figure 12:
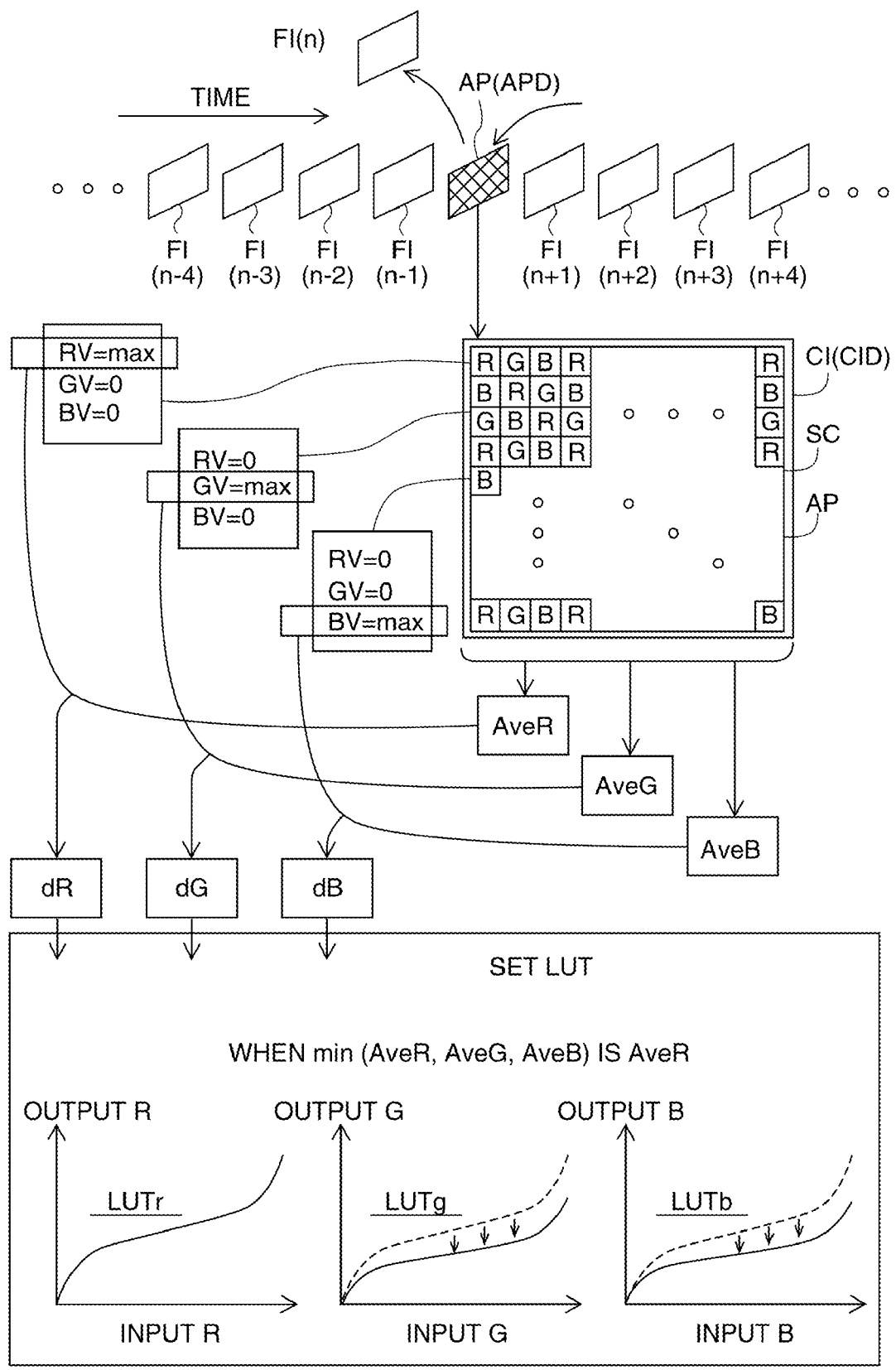
FIG. 12 is a schematic view showing the color adjustment.

FIG. 12 is a schematic view showing the color adjustment. The upper portion of FIG. 12 shows a plurality of time-series frame images to be sequentially projected. The upper portion shows 9 frame images numbered "n−4" through "n+4" (n is an integer). The frame images FI numbered "n−4" through "n+4" represent frame images supplied from the image supplier 900 (FIG. 8). It is assumed in FIG. 12 that after the "n−1" frame image FI is projected, but before the "n" frame image FI is projected, the condition for making the color adjustment has is satisfied. In this case, the frame selection module M30 selects an adjustment pattern AP described by the adjustment pattern data APD instead of the "n" frame image FI. The frame selection module M30 then instructs the projection module M20 to project the adjustment pattern AP. As a result, the adjustment pattern AP is projected instead of the "n" frame image FI. In the present embodiment, the "n+1" frame image FI and the following frame images FI are normally projected, as will be described later. The adjustment pattern AP corresponds to the "adjustment image" in the claims.

In the following step S230 in FIG. 10, the frame selection module M30 (FIG. 9) instructs the CCD 500 (FIG. 11) to image the projection surface. The CCD 500 performs imaging in accordance with the instruction. The middle portion of FIG. 12 shows an image CI captured by the CCD 500. The CCD 500 images the projection surface on which the adjustment pattern AP has been projected. The captured image CI shows the imaged adjustment pattern AP.

In the present embodiment, the adjustment pattern AP has a plurality of red blocks (R), a plurality of green blocks (G), and a plurality of blue blocks (B) arranged in a grid pattern so that the blocks are distributed over the screen. In the adjustment pattern data APD, the color of each of the blocks is expressed in terms of the following gray scales.

The color of the red blocks (R): red gray scale RV=maximum, green gray scale GV=0, blue gray scale BV=0

The color of the green blocks (G): red gray scale RV=0, green gray scale GV=maximum, blue gray scale BV=0

The color of the blue blocks (B): red gray scale RV=0, green gray scale GV=0, blue gray scale BV=maximum The "maximum" represents the maximum value within the range of possible gray scales. For example, when possible gray scales ranges from 0 to 255, the maximum is 255.

When the imaging is completed, the frame selection module M30 (FIG. 9) returns the control to the step S200. The frame selection module M30 then instructs the projection module M20 to project images according to the image signal from the image supplier 900 (FIG. 8). The projection module M20 projects images in accordance with the instruction. In the present embodiment, the projection module M20 cancels the projection of the "n" frame image FI and projects the "n+1" frame image FI and the following images. The projection module M20, however, may project the "n" frame image FI and the following images subsequent to the adjustment pattern AP.

When the imaging is completed, in addition to the above operation, the color adjustment module M10 (FIG. 9) instructs the color comparator 280 (FIG. 11) to adjust the lookup table P2 (the step S240 in FIG. 10). In the present embodiment, the lookup table p2 corresponds to a setting for adjusting the color of the projection light.

In accordance with the instruction, the color comparator 280 (FIG. 11) first acquires captured image data CID from the CCD 500. The image data CID may be supplied to the color comparator 280 via the RAM 230, as in the case of the embodiment shown in FIG. 5. The color comparator 280 then analyzes the acquired image data CID to calculate the average of the red component gray scales AveR of the pixels forming the red blocks, the average of the green component gray scales AveG of the pixels forming the green blocks, and the average of the blue component gray scales AveB of the pixels forming the blue blocks (FIG. 12). The relationship of the red, green, and blue blocks with the pixels in the captured image CI is experimentally determined in advance. Alternatively, the color comparator 280 may use the color of pixels to identify the block formed of the pixels.

The color comparator 280 (FIG. 11) then acquires the adjustment pattern data APD from the ROM 220 and calculates the difference between the adjustment pattern data APD and the image data CID. Specifically, the color comparator 280 calculates a red difference dR, a green difference dG, and a blue difference dB (FIG. 12). The red difference dR is obtained by subtracting the red average AveR from the red gray scale RV of the red blocks in the adjustment pattern data APD. The differences for the other color components dG and dB are similarly calculated.

When an image reproduced on the projection surface has a good color balance, the differences dR, dG, and dB are substantially the same. When the color balance deteriorates, however, some of the differences become larger (or smaller) than the others. For example, when the red looks paler than the green and blue in a projected image, the red average AveR is smaller than the green average AveG and the blue average AveB, and the red difference dR is greater than the green difference dG and the blue difference dB accordingly. Such color balance deterioration occurs in a variety of cases, for example, when colored light illuminates the projection surface, or when projection light is projected on a colored projection surface (a beige wall, for example).

In the present embodiment, the color comparator 280 (FIG. 11) adjusts the lookup table P2 (FIG. 11) in such a way that the difference between any two pairs of the three values dR, dG, and dB is small. The lower portion of FIG. 12 shows an example of the adjustment of the lookup table P2. It is assumed in this embodiment that the red average AveR is the smallest of the three averages AveR, AveG, and AveB. In this case, the green (G) and blue (B) look deep in an image reproduced on the projection surface. The color comparator 280 modifies the green and blue lookup tables LUTg, LUTb in such a way that the intensities of green (G) and blue (B) decrease. In the embodiment shown in FIG. 12, the lookup tables LUTg and LUTb are modified in such a way that the modified output value for a certain input value is smaller than the non-modified output value for the same input value, whereas the red lookup table LUTr is not modified.

After the lookup table P2 is modified, the color adjuster 270A (FIG. 11) makes VT correction in accordance with the modified lookup table P2 (S200 in FIG. 10). As a result, the color balance deterioration in the image reproduced on the projection surface is corrected. In the present embodiment, the modification of the lookup table P2 causes the hue, chroma, and brightness of the projection light to be adjusted. Further, in the present embodiment, the VT correction is made uniformly across each frame image. That is, the colors of all the pixels are adjusted in accordance with a common lookup table P2.

In the present embodiment, one of a plurality of time-series frame images to be sequentially projected is replaced with an adjustment pattern AP. It is therefore possible to eliminate the disadvantageous situation in which adjusting the projection light inhibits the user from projecting a desired image. It is noted that two or more frames may be replaced with an adjustment pattern AP. In this case, a plurality of consecutive time-series frames are preferably replaced with an adjustment pattern AP. In this manner, the CCD 500 can readily image the projection surface on which the adjustment pattern AP is projected. It is noted that the smaller the number of frames on which an adjustment pattern AP is projected, the less the user feels strange.

The color comparator 280 (FIG. 11) may modify the lookup table P2 at any timing after the step S230 in FIG. 10. For example, the color comparator 280 may modify the lookup table P2 concurrently with the step S200. Alternatively, the color comparator 280 may modify the lookup table P2 during the period in which the control returns from the step S230 to the step S200.

In the present embodiment, a fixed adjustment pattern data APD is used. It is therefore also possible to balance the intensities of the colors in accordance with the color component averages AveR, AveG, and AveB without using the color component differences dR, dG, and dB. The color comparator 280 may not therefore need to acquire any adjustment pattern data APD or calculate the color component differences dR, dG, and dB. Further, variable adjustment pattern data APD may be used (for example, an adjustment image supplied from the user may be used). In this case, the color comparator 280 may use the adjustment image and captured image data CID to calculate the differences for predetermined colors and adjust the lookup table P2 (FIG. 11) in accordance with the differences (for example, the differences for the RGB components dR, dG, and dB may be calculated, and the lookup table P2 may be adjusted in such a way that the difference between any two pairs of the three values dR, dG, and dB is small). In this manner, an arbitrary image can be used for the color adjustment. In this case, it is preferable to employ an image different from the frame images supplied from the image supplier 900. In this manner, an image suitable for the color adjustment can be readily used. A variety of known methods can be employed as the color adjustment method using such an adjustment image and data APD and CID.

In the present embodiment, the CPU 210 (color adjustment module M10), the brightness comparator 260, the color adjuster 270A, and the color comparator 280 as a whole correspond to the "adjuster" in the claims.

D. Fourth Embodiment

Figure 13:
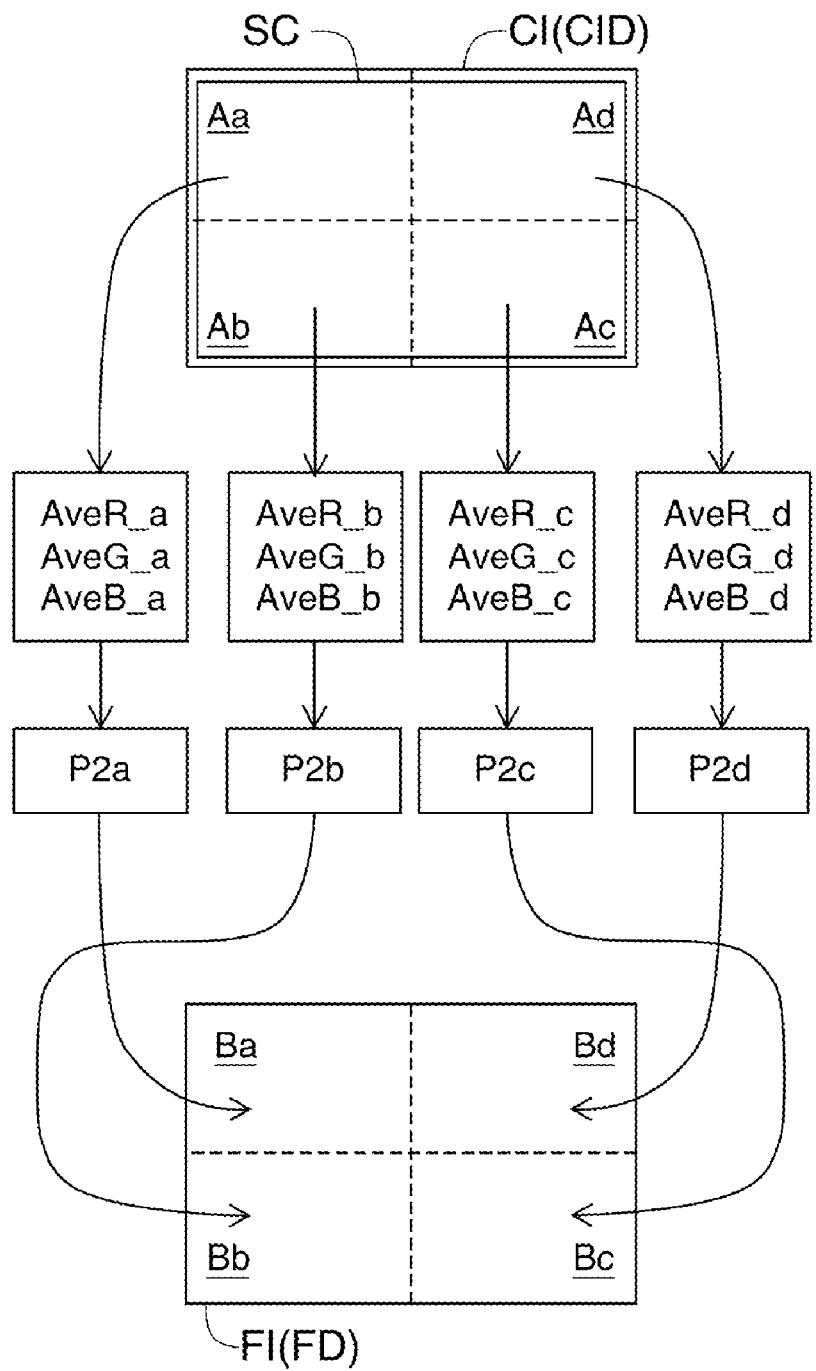
FIG. 13 is a schematic view of another embodiment of the color adjustment.

FIG. 13 is a schematic view of another embodiment of the color adjustment. This embodiment differs from the embodiment shown in FIG. 12 in two ways. A first difference is that the color comparator 280 (FIG. 8) divides an image CI captured by the CCD 500 into a plurality of blocks and determines a lookup table for the VT correction for each of the blocks. A second difference is that the color adjuster 270A divides frame data FD into a plurality of blocks, as in the case of the image CI, and makes the VT correction on each of the blocks. The procedure of the processes is the same as that in the third embodiment shown in FIG. 10. The configuration of the projector is the same as that of the projector 100A shown in FIGS. 8 and 9.

In the embodiment shown in FIG. 13, the image CI is divided into four rectangular blocks As to Ad, as in the case of the embodiment shown in FIG. 7. In the step S240 in FIG. 10, the color comparator 280 (FIG. 8) calculates the averages for the RGB components for each of the blocks Aa to Ad (four sets of averages AveR_a, AveG_a, AveB_a to AveR_d, AveG_d, AveB_d). The method for calculating the averages is the same as that in the embodiment shown in FIG. 12. The color comparator 280 then determines a lookup table for each of the blocks Aa to Ad (four sets of lookup tables P2a to P2d). Each of the lookup tables P2a to P2d contains tables for the three colors (RGB). The method for determining the lookup tables is the same as that in the embodiment shown in FIG. 12.

The color adjuster 270A (FIG. 8) divides each frame image FI described by the frame data FD into a plurality of blocks, as in the case of the captured image CI, and makes the VT correction on each of the blocks. The relationship between the blocks in the image CI and the blocks in the frame image FI is set in the same manner as in the embodiment shown in FIG. 7. As a result, the color adjustment on each of the blocks can be made appropriately in agreement with the portion of the projection surface on which the block is actually projected.

In the present embodiment, since the color adjustment is made in the same manner as in the embodiment shown in FIG. 12, the color balance of an image reproduced on the projection surface will not deteriorate. As a result, the color adjustment can be appropriately made as a function of the position in an image. In some cases, colored light may be incident, for example, on an upper left portion of the screen SC. In this case, the apparent color balance of the first block Aa in the image CI deteriorates. In the present embodiment, however, the color adjustment is made on each of the blocks. It is therefore possible to prevent the color balance from partially deteriorating when the upper left portion of a projected frame image FI is illuminated with colored light.

To adjust the color of a block in a frame image FI, the average values for the RGB components in the corresponding area in a captured image CI are not necessarily used, but a variety of other values obtained from part of the corresponding area in the captured image CI can be used. For example, a value representing the color at a predetermined representative position in the corresponding area (RGB gray scales, for example) may be used. A value representing the average color at a plurality of predetermined representative positions in the corresponding area may alternatively be used.

E. Variations

Among the components in the embodiments described above, those that are not claimed in the independent claims are additive components and can be omitted as appropriate. The invention is not limited to the embodiments and embodiments described above, but can be implemented in a variety of aspects to the extent that they do not depart from the spirit of the invention. For example, the following variations are possible.

First Variation

In each of the embodiments described above, the process of adjusting the brightness of the projection light in accordance with the output from an optical sensor (CCD 500 (FIGS. 1 and 8), for example) that receives the light from the projection surface before the light source illuminates is not limited to the gamma correction shown in FIG. 4, but can be an arbitrary process. For example, the brightness comparator 260 may determine a brightness adjustment factor, and the color adjuster 270 or 270A may multiply the brightness value before correction by the factor for the brightness adjustment. Alternatively, the luminosity of the light source 410 may be adjusted instead of brightness data. In this case, the brightness comparator 260 may control the light source 410.

The optical sensor that receives the light from the projection surface is not limited to the CCD 500 or other imaging devices, but can be a variety of other optical sensors. For example, a sensor that measures the color (or brightness) at one or more predetermined positions on the projection surface may be employed. In this case as well, the brightness of the projection light may be adjusted in accordance with the output from the optical sensor.

In any of the above cases, the brightness of the projection light is preferably adjusted in accordance with the brightness of the projection surface expressed in the form of the output from the optical sensor. The relationship between the brightness of the projection surface and the amount of adjustment to be made on the brightness of the projection light is not limited to the relationship shown in FIG. 4, but can be a variety of other relationships. For example, the gamma correction value P1 may change stepwise as the average brightness value AveBr changes in the embodiment shown in FIG. 4. Further, the range of possible gamma correction values P1 may be 1 or greater or 1 or smaller. In any of the above cases, the brightness of the projection light is preferably adjusted in such a way that the brightness of the projection light produced when the brightness of the projection surface expressed in the form of the output from the optical sensor is higher than a predetermined threshold is higher than the brightness of the projection light produced when the brightness of the projection surface is lower than the predetermined threshold.

Second Variation

In each of the embodiments described above, the process of adjusting the color of the projection light in accordance with the output from the optical sensor (CCD 500 (FIG. 8), for example) that receives the light from the projection surface on which an adjustment image is projected is not limited to the VT correction shown in FIG. 12, but can be an arbitrary process. For example, the color comparator 280 may determine RGB component factors, and the color adjuster 270A may multiply the RGB gray scales before correction by the factors for the color adjustment. Separate light sources may be used for respective color components (for the respective RGB components, for example). In this case, the luminosity of the light source for each of the colors may be adjusted instead of color data. In this case, the color comparator 280 may control the light sources.

The color components to be adjusted in the color adjustment are not limited to the RGB components, but can be any color components (brightness, hue, and chroma, for example). Further, the total number of color components to be adjusted is not limited to three, but any number can be employed (one or two can be employed, for example). As described above, the color adjustment can be a process of adjusting at least one of a plurality of color components that form the color of the projection light. For example, a process of adjusting the brightness or a process of adjusting the hue may be employed.

The optical sensor that receives the light from the projection surface is not limited to the CCD 500 or other imaging devices, but can be a variety of other optical sensors. For example, a sensor that measures the color at one or more predetermined positions on the projection surface may be employed. In this case as well, the color of the projection light may be adjusted in accordance with the output from the optical sensor.

In any of the above cases, a color component of the projection light is preferably adjusted in accordance with the same one of the color components (color components that form the color of the projection surface) expressed in the form of the output from the optical sensor. The relationship between any of the color components that form the color of the projection surface and the amount of adjustment to be made on the same color component of the projection light can be an arbitrary relationship. For example, the color of the projection light may be adjusted so that the color balance is adjusted, as shown in FIG. 12. Alternatively, the brightness of the projection light may be adjusted in accordance with the graph RG shown in FIG. 4. Still alternatively, what is called memory color adjustment may be employed. In the memory color adjustment, the color is adjusted in such a way that a color within a predetermined color range is reproduced by using a predetermined target color.

Third Variation

In each of the embodiments described above, the adjustment pattern (adjustment image) used in the adjustment of the color of the projection light is not limited to the adjustment pattern AP shown in FIG. 12, but can be an arbitrary pattern. For example, the red gray scale RV of the red blocks may be set to a value between the minimum and maximum values (the same thing applies to the blocks of the other colors). Alternatively, a gradation pattern the gray scale of which changes from black to white may be used as the adjustment pattern. Such an adjustment pattern may be used to adjust the color (brightness, for example) of the projection light. For example, the brightness of the projection light may be adjusted in accordance with the average brightness value of the entire image. Alternatively, a plurality of gradation patterns in which black changes to white in different directions may be used (for example, the following four types of patterns may be used: patterns in which black changes to white "from above to below," "from below to above," "from left to right," and "from right to left"). In this case, the color of the projection light may be adjusted by considering all results obtained by imaging the plurality of patterns. For example, the color of the projection light may alternatively be adjusted in accordance with the average of the plurality of imaging results. When a plurality of adjustment patterns are used as described above, the steps S220 and S230 in FIG. 10 are repeated the number of times corresponding to the number of adjustment patterns. In this process, a frame image according to an image signal may be interposed between the plurality of adjustment patterns to be sequentially projected.

To prepare an adjustment image, data representing the adjustment image are not necessarily stored in a memory in advance, but a variety of methods can be employed. For example, image data supplied from the user may be used as the adjustment image. Alternatively, the projector may include an adjustment image generator that generates data representing an adjustment image in accordance with a parameter value. The adjustment image generator may supply adjustment image data to the timing controller 300 in accordance with an instruction from the frame selection module M30 (FIG. 9). The parameter value may be determined in advance or determined by the user.

Fourth Variation

In the embodiment shown in FIG. 10, the color adjustment is not necessarily made when the present time corresponds to a scheduled timing, but the condition for making the color adjustment can be any other conditions. For example, the color adjustment may be made when "the illuminance in the environment in which the projector is placed changes." In this manner, the color of the projection light can be automatically adjusted when the illumination in the room in which the projector is placed is turned on or off or when the curtain in the room is opened or closed. Further, an illuminance sensor may be provided in the projector to obtain the illuminance in the environment. A variety of methods can be employed to sense that the illuminance has changed. For example, sensing the change in illuminance may be performed by sensing that the difference between the illuminance when the projector is started and the illuminance at the present time becomes greater than a predetermined threshold. Further, once the color adjustment has been made, sensing the change in illuminance may be performed by sensing that the difference between the illuminance when the last color adjustment was made and the illuminance at the present time becomes greater than a predetermined threshold. Alternatively, sensing the change in illuminance may be performed by sensing that the amount of change in illuminance per unit time becomes greater than a threshold.

Still alternatively, the color adjustment may be made when "the projector has been displaced." In this manner, the color of the projection light can be automatically adjusted whenever the projector is displaced. To sense that the projector has been displaced, an acceleration sensor may be provided in the projector.

Employing any of the conditions described above allows the adjustment of the projection light according to an environmental change to be made without any problem. The condition for making the color adjustment can be any one or more of the variety of conditions described above. When a plurality of conditions are employed, the result of an inclusive OR operation on the plurality of conditions may be employed.

Fifth Variation

In each of the embodiments described above, the method for adjusting the color or brightness of the projection light as a function of the position in a projected image is not limited to the method for adjusting the color or brightness for each block, but can be any other methods. For example, interpolation may be used to determine an adjustment setting at each position within an image. The adjustment setting used herein means a setting used in color or brightness adjustment (the gamma correction value P1 and the lookup table P2, for example). In this case, the adjustment settings at a plurality of predetermined representative positions in a projected image may be determined in accordance with a captured image. The adjustment settings at positions different from the representative positions may then be determined by using interpolation. The method for determining the adjustment settings at the representative positions can be the same as the method used in the above embodiments.

Sixth Variation

The color adjustment shown in FIGS. 8 to 12 and FIG. 13 described above can be applied to a variety of projectors. For example, the brightness adjustment of the projection light according to the output from the optical sensor before the light source 410 illuminates may be omitted in the embodiment shown in FIGS. 8 to 12. In this case, the brightness comparator 260 shown in FIG. 8 can be omitted.

Seventh Variation

In each of the embodiments described above, the configuration of the projector is not limited to the configurations shown in FIGS. 1 and 8, but can be a variety of other configurations. For example, a modulator that modulates the light from the light source into projection light representing an image is not limited to a liquid crystal light valve, but can be a variety of other devices. For example, a DMD (Digital Micromirror Device, a trademark of TI (Texas Instruments)) may be employed.

Eighth Variation

The invention can be implemented in the following variety of forms.

A projector that projects an image on a projection surface in accordance with an image signal, the projector including
an optical system that includes a light source and projects projection light representing the image,
an optical sensor that receives the light from the projection surface,
a frame selector that selects an adjustment image, during image projection according to the image signal, as part of a plurality of time-series frame images to be sequentially projected, and
an adjuster that carries out an adjustment process of adjusting the color of the projection light in accordance with the output produced by the optical sensor when the adjustment image is projected.

According to the above configuration, since the color of the projection light is adjusted in accordance with the projected adjustment image during image projection according to the image signal, it is possible to prevent a disadvantageous situation in which adjusting the projection light inhibits a user from projecting a desired image.

Ninth Variation

In each of the embodiments described above, part of the configuration achieved by hardware may be replaced with software, or conversely, part or all of the configuration achieved by software may be replaced with hardware. For example, the function of the color adjuster 270 shown in FIG. 1 may be achieved by a program executed by the CPU 210.

When part or all of the functions of the invention are achieved by software, the software (computer program) can be provided in the form of a computer readable recording medium with the software stored thereon. In the invention, the "computer readable recording medium" is not limited to a flexible disk, a CD-ROM, and other portable recording media, but includes a variety of RAMs, ROMs, and other internal storage devices in a computer, and a hard disk drive and other external storage devices connected to the computer.

What is claimed is:

1. A projector that projects an image on a projection surface in accordance with an image signal, the projector comprising:
an optical system that includes a light source and projects projection light representing the image;
an optical sensor that receives the light from the projection surface when the light source is not illuminated, the light being received by the optical sensor after the projector is powered on and before the light source illuminates; and
an adjuster that carries out a first adjustment process of adjusting a brightness of the projection light in accordance with the output from the optical sensor, the first adjustment process being carried out after the projector is powered on and before the light source illuminates, the output from the optical sensor being based on the light received by the optical sensor from the projection surface.

2. The projector according to claim 1, further comprising:
a frame selector that selects an adjustment image, during image projection according to the image signal, as part of a plurality of time-series frame images to be sequentially projected,
wherein the adjuster carries out a second adjustment process of adjusting a color tone of the projection light in accordance with the output produced by the optical sensor when the adjustment image is projected.

3. The projector according to claim 2,
wherein the frame selector selects the adjustment image to allow the adjuster to carry out the second adjustment process in response to at least one of the following:
(A) a scheduled timing,
(B) change in illuminance in the environment in which the projector is placed, and
(C) displacement of the projector.

4. The projector according to claim 1,
wherein the optical sensor is an imaging unit that images the projection surface to acquire image data, and
the adjuster adjusts the brightness as a function of the position in a projected image in the first adjustment process in accordance with first image data acquired by the imaging unit before the light source illuminates.

5. The projector according to claim 4,
wherein in the first adjustment process, the adjuster divides a projected image into a plurality of blocks and adjusts the brightness of each of the blocks in accordance with part of the area in the first image data on which the block is projected.

6. The projector according to claim 1,
wherein in the first adjustment process, the adjuster adjusts the brightness of the projection light in such a way that the brightness of the projection light produced, when the brightness of the projection surface expressed in the form of the output from the optical sensor is higher than a predetermined threshold, is higher than the brightness of the projection light produced when the brightness of the projection surface is lower than the predetermined threshold.

7. The projector according to claim 2,
wherein the optical sensor is an imaging unit that images the projection surface to acquire image data, and
the adjuster adjusts the color tone as a function of the position in a projected image in the second adjustment process in accordance with second image data acquired by the imaging unit when the adjustment image is projected.

8. The projector according to claim 7,
wherein in the second adjustment process, the adjuster divides a projected image into a plurality of blocks and adjusts the color tone of each of the blocks in accordance with part of the area in the second image data on which the block is projected.

9. A method for controlling a projector that projects an image on a projection surface in accordance with an image signal, the method comprising:
   imaging the projection surface when a light source of the projector is not turned on, the imaging being performed after the projector is turned on and before an image projection;
   determining an adjustment setting in accordance with an imaging result that is based on the imaging of the projection surface, the adjustment setting being determined after the projector is turned on and before the image projection;
   turning on the light source, for the image projection, included in the projector;
   correcting a brightness of an image in accordance with the adjustment setting; and
   projecting the image of which the brightness is corrected.

10. The method according to claim 9, further comprising:
   correcting color of the image in accordance with the adjustment setting;
   projecting the image of which the color is corrected;
   judging whether a condition for making color adjustment is satisfied;
   when the condition is satisfied,
      projecting an adjustment pattern to the projection surface;
      imaging the adjustment pattern projected to the projection surface; and
      determining the adjustment setting in accordance with the imaged adjustment pattern for a preparation of the next correcting color.

\* \* \* \* \*